United States Patent
Leppke et al.

(10) Patent No.: US 6,669,221 B2
(45) Date of Patent: Dec. 30, 2003

(54) MOTORCYCLE KICKSTAND ANTI-SINK ATTACHMENT

(75) Inventors: Alan D. Leppke, Los Ranchos De Albuquerque, NM (US); David V. Gonzales, Albuquerque, NM (US)

(73) Assignee: Sink-No-Bob, Ltd. Co., Albuquerque, NM (US)

(*) Notice: Subject to any disclaimer, the term of this patent is extended or adjusted under 35 U.S.C. 154(b) by 91 days.

(21) Appl. No.: 09/917,022

(22) Filed: Jul. 26, 2001

(65) Prior Publication Data

US 2002/0014766 A1 Feb. 7, 2002

Related U.S. Application Data

(60) Provisional application No. 60/220,956, filed on Jul. 26, 2000.

(51) Int. Cl.[7] ................................................. B62H 1/02
(52) U.S. Cl. ..................... 280/295; 280/301; 248/188.9
(58) Field of Search .......................... 135/78; 280/293, 280/301, 295, 298, 304, 763.1; 248/188.9, 188.8, 346.03, 346.01, 346.04

(56) References Cited

U.S. PATENT DOCUMENTS

| | | | |
|---|---|---|---|
| 2,799,287 A | * | 7/1957 | Wagner |
| 3,712,640 A | * | 1/1973 | Shipman et al. ............ 280/301 |
| 3,955,829 A | | 5/1976 | Bussler ....................... 280/301 |
| 3,998,470 A | | 12/1976 | Houston ..................... 280/301 |
| 4,457,530 A | | 7/1984 | Johnson ..................... 280/293 |
| 4,474,387 A | | 10/1984 | Maranell et al. ........... 280/293 |
| 4,521,031 A | | 6/1985 | Huth .......................... 280/293 |
| 4,625,987 A | | 12/1986 | Marsh ........................ 280/293 |
| 4,768,800 A | | 9/1988 | Johns ......................... 280/293 |
| 4,964,430 A | * | 10/1990 | Janis ............................ 135/78 |
| 4,971,347 A | | 11/1990 | Cline ......................... 280/301 |
| 5,257,803 A | | 11/1993 | Fisher ........................ 248/346 |
| 5,351,981 A | | 10/1994 | Thomas ..................... 280/301 |
| 5,377,710 A | * | 1/1995 | Laser ........................... 135/66 |
| 5,670,229 A | * | 9/1997 | Lynch et al. ................. 428/52 |
| 6,164,306 A | * | 12/2000 | Townsend .................... 135/77 |

* cited by examiner

*Primary Examiner*—Avraham Lerner
(74) *Attorney, Agent, or Firm*—Rod D. Baker

(57) ABSTRACT

An apparatus to be attached to the end of a motorcycle kickstand to prevent the end of the kickstand from sinking into the supporting surface. A supporting pad has a pair of attachment tabs extending therefrom, with which the supporting pad can be attached to the distal end of a kickstand. The pad and tabs preferably are integrally die-cut from a sheet of reinforced rubber, the tabs being flexibly bendable. The tabs are bent into close contact with the leg of the kickstand, with the supporting pad located beneath the distal end of the kickstand. A tightening band is wrapped and tightened around the kickstand leg and the bent tabs to secure the apparatus upon the end of the kickstand.

11 Claims, 3 Drawing Sheets

MOTORCYCLE KICKSTAND ANTI-SINK ATTACHMENT

CROSS-REFERENCE TO RELATED APPLICATIONS

This application claims the benefit of the filing of U.S. Provisional Patent Application Ser. No. 60/220,956 entitled "Motorcycle Kickstand Anti-sink Apparatus," filed on Jul. 26, 2000, and the specification thereof is incorporated herein by reference.

BACKGROUND OF THE INVENTION

1. Field of the Invention (Technical Field)

The present invention relates to motorcycles, specifically motorcycle kickstands, and more particularly to an attachment to a motorcycle kickstand that substantially increases the supportive surface area or footprint of the kickstand when in use.

2. Background Art

It is common to support a motorcycle in the upright position when not in use. Common practice is to use what is termed a "kickstand." A typical kickstand consists of a leg that is pivotally mounted to the frame of a motorcycle with this leg to be pivoted approximately 90 degrees from a retracted position to a deployed position. The free outer end of the kickstand normally includes a base plate. The kickstand ordinarily is mounted with a spring-actuated over-center mechanism known in the art. The rider uses his foot to cause the kickstand to be deployed from a retracted position (approximately parallel to the ground) to the extended position (and vice versa), hence the reason for the nomenclature "kickstand."

A major problem in conjunction with a conventional kickstand is that the baseplate has an inadequately small surface area. It is not unusual for a motorcycle to weight in excess of 318.18 kilograms (700 pounds). This heavy weight combined with the relatively small surface area of the base plate causes the kickstand to penetrate the surface on which the kickstand is deployed if said surface is anything but an absolutely non-yielding surface such as concrete. If however the kickstand is deployed for use on a soft surface such as sand, loose dirt, sod, mud, or hot asphalt, the kickstand will sink into the surface. As the kickstand sinks, it causes an increasing angle of inclination of the motorcycle in relation to the ground, such that the center of gravity of the motorcycle reaches the point where the vehicle topples over. In addition to being difficult to return to an upright position, the fall of said vehicle can be quite costly due to damages incurred from impact with the ground.

Previously, other devices have been proposed which function to prevent a motorcycle kickstand from sinking into the underlying road surface or terrain. However, all of these devices have serious shortcomings that have prevented the devices from coming into more widespread use. For example: Devices such as those used in U.S. Pat. Nos. 4,521,031 to Huth, 5,257,803 to Fisher, and 4,474,387 to Maranell et al. are often forgotten by the operator and left behind when the operator drives away. Thus the operator incurs the expense of purchasing the device which is quickly left behind and lost, because it is not an integral part of the kickstand. U.S. Pat. Nos. 4,971,347 to Cline, and 3,998,470 to Houston feature devices that must be properly installed and aligned, and due to complex mechanical design require constant attention and or adjustments. In U.S. Pat. No. 4,625,987 to Marsh, and all prior art listed above, flexibility is lacking and the devices fail to conform to all possible surfaces. Furthermore, these devices have limited applications due to product designs that prohibit their adaptation for use on different kickstand configurations.

In addition, it remains desirable to provide an attached kickstand support that is affordable and readily adaptable to mass production. It should be flexible so as to conform to all possible surfaces, as well as lightweight, trouble free, and simple to install.

Most of the prior art devices have inherent safety concerns associated with them. Unattached devices are prone to slippage, both the kickstand sliding off of the device, and the device slipping on the underlying road surface or terrain. An attempt was made to address this problem in both U.S. Pat. No. 5,257,803 to Fisher, and U.S. Pat. No. 4,474,387 to Maranell et al.

Mechanical devices such as U.S. Pat. Nos. 3,998,470 to Houston, and 4,971,347 to Cline are complicated mechanical devices and as such are difficult to install, not readily adaptable to various kickstand configurations, and also require constant attention and or adjustment that may be beyond the expertise of the average user. In U.S. Pat. No. 4,625,987 to Marsh, a chain is utilized in an unsafe and compromising manner.

In U.S. Pat. No. 4,521,031 to Huth, the device is manufactured from a plastic which is extremely slick, is prone to slippage on both the road or underlying surface, as well as between the base plate of the kickstand and the top surface of the device.

SUMMARY OF THE INVENTION
(DISCLOSURE OF THE INVENTION)

The purpose of this invention is to provide the ultimate solution to a problem that has existed since the advent of the motorcycle. There have been numerous unsuccessful attempts to address these issues.

The inventive apparatus improves upon the prior art because, among other reasons:

1. The intention of this device is to provide an increased footprint at the base of the kickstand, therefore preventing the kickstand from sinking into pliant surfaces.
2. It is the intention of this device to be attached to the kickstand thereby preventing loss, and to ensure ease of use. Attachment is extremely easy and simple, utilizing a common nylon cable tie.
3. It is also the intent of this device to be maintenance-free; once properly installed upon a kickstand, no adjustment is necessary.
4. It is further intended for this device to be extremely durable and long lasting. This device has the potential to last the lifetime of the motorcycle.
5. It is the intent of this device to posses flexibility, so as to conform to inconsistencies in the underlying road surface or terrain. An added advantage of this flexibility is to enable the device to conform and adapt to kickstand design variations.
6. It is the intent of this device to posses qualities of abrasion and tear resistance.
7. This device is also intended to address numerous safety concerns. First and foremost, a falling motorcycle due to a sinking kickstand is not only a potential hazard to the operator, but also a hazard to bystanders and or vehicles in close proximity. In addition, due to its flexibility, this device will not present a safety hazard if said device comes in contact with an unforeseen object while the kickstand is in the retracted position with the motorcycle in motion.

8. It is the intent of this device to be easily mass produced, this is possible due to the simplicity of the design.

9. It is further intended that this device be non-obtrusive, inconspicuous, and lightweight.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The invention is an apparatus attachable to the distal end of a motorcycle kickstand to prevent the kickstand from sinking into the ground while in use. A typical kickstand is a rigid rod, herein called a "leg," pivotally connected at its proximate end to the frame of the motorcycle, while its distal end is intended to engage against the ground to support the motorcycle while the kickstand is in use. Most kickstands feature a generally planar base plate secured at the distal end of the leg, although such is not required and the present invention is useable with kickstands having legs lacking discrete baseplates (e.g. the distal terminus of the leg directly contacts the ground when in use). In this disclosure and in the claims, "base plate" means the distal terminus of the leg in instances where no base plate is used.

Figure 1:
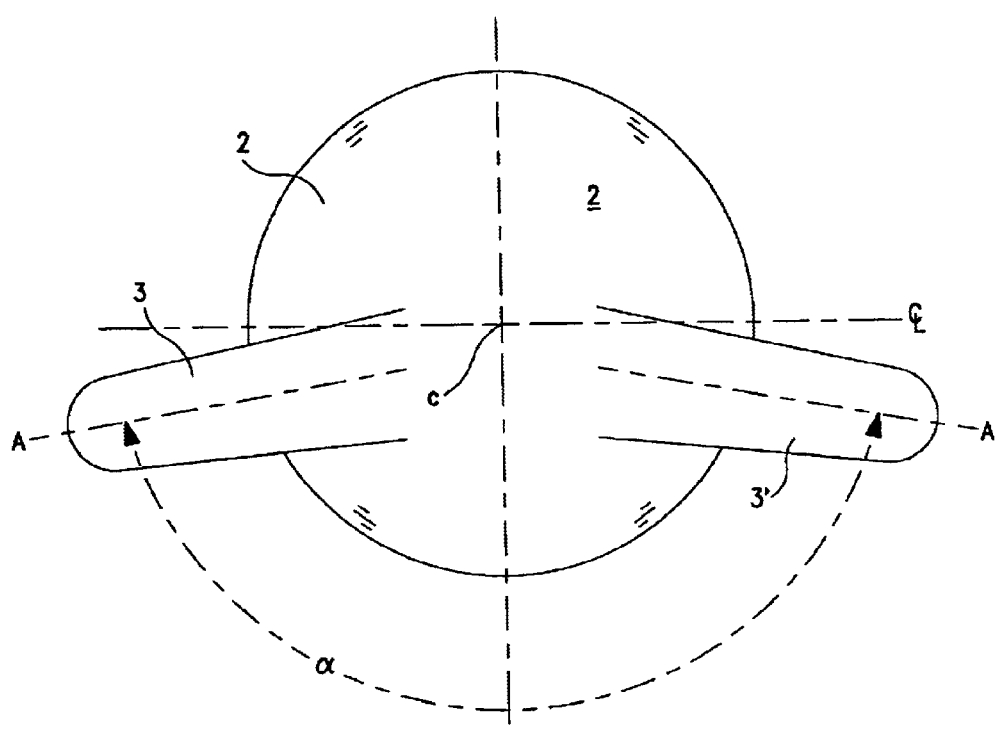
FIG. 1 is a top plan view of a preferred embodiment of the apparatus according to the invention.
Figure 2:
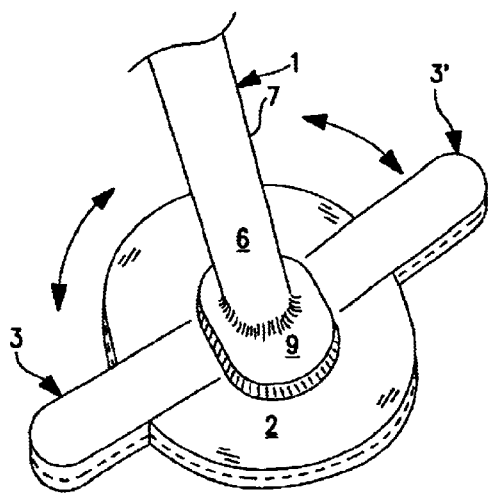
FIG. 2 is a perspective view, from above, of the apparatus according to the invention, shown placed upon the ground and with a kickstand base plate resting thereon, the apparatus having a supporting pad with a pair of attachment tabs extending therefrom.

Attention is invited to FIGS. 1 and 2, illustrating the preferred embodiment of the invention for use with a kickstand having a leg 1 having an outer face 6 and an inner face 7, and a base plate 9 at the distal end. The invention features a supporting pad 2 and at least one, preferably at least two, and most preferably two, flexible attachment tabs 3, 3' connected to the supporting pad 2. FIGS. 1 and 2 illustrate that the supporting pad 2 preferably has a very generally circular (or mildly elliptical), disk-like shape, from which the attachment tabs 3, 3' extend. As suggested in FIGS. 1 and 2, each attachment tab 3, 3' preferably defines a longitudinal axis A of symmetry, with the length of each attachment tab preferably being substantially greater than the radius of the supporting pad 2.

Figure 3:
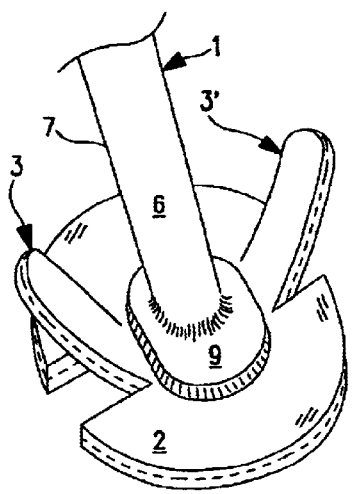
FIG. 3 is a perspective view, from above, of the apparatus seen in FIG. 2, showing the attachment tabs partially folded upward toward the leg of the kickstand.

The supporting pad 2 and tabs 3, 3' preferably are fashioned from a durable, resiliently bendable reinforced rubber. "Rubber" may include synthetic polymers offering oil and fire resistance. In the preferred embodiment, the tabs and pad are die-cut from a sheet of fireproof and oil-resistant rubber, reinforced with one or more layers of nylon or cotton fabric or cords, available from Allstate, Inc. of Earth City, Mo. USA; or more preferably from utility belting material available as Item No. 49, "3 Ply, 28 oz. Black 1/16" Pebbletop with Friction Surface and Cotton Carcass, available from Apache Belting Co. of Cedar Rapids, Iowa USA. Ideally, the upper surface of the pad 2 and tabs 3, 3' features a molded "pebble" or corrugated finish to promote frictional contact between the apparatus and the kickstand. Alternatively, the supporting tabs and pad may be manufactured from leather, bendable metal, or bendable plastic. The tabs 3, 3' are bendably connected to the supporting pad 2; in the preferred embodiment, the pad and tabs are stamp cut from stock sheet of reinforced rubber, so that the tabs are integral with the pad. The tabs 3, 3' may be cut, for example by die-cutting, so as to be partially detachable from the pad 2 with which they are formed, as suggested by FIG. 3.

The supporting pad 2 preferably has a diameter well in excess of the maximum horizontal dimension of the base plate 9. For example, base plates 9 commonly are circular or elliptical in plan profile. The pad 2 preferably has a diameter or other major dimension is at least about twice to three times the maximum horizontal dimension of the base plate 9. When the apparatus of the invention is in use, the base plate 9 is approximately centered on the top surface of the supporting pad 2 with the ground-engaging surface of the base plate in flush contact with the top of the pad 2 as indicated in FIG. 2. The tabs 3, 3' are then employed to securely attach the apparatus to the distal end of the kickstand, as shall be explained.

Figure 4:
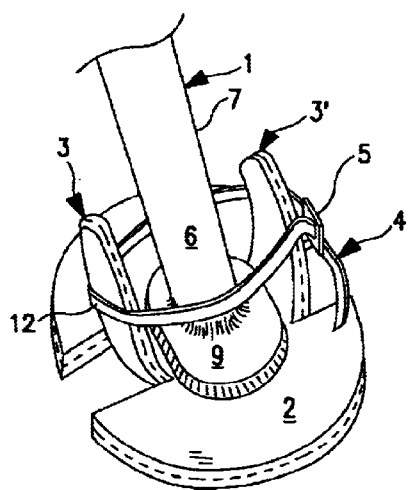
FIG. 4 is a perspective view, from above, of the apparatus seen in FIG. 3, showing the attachment tabs partially folded upward toward the leg of the kickstand and with a tightener band in place thereon prior to being tightened.
Figure 5:
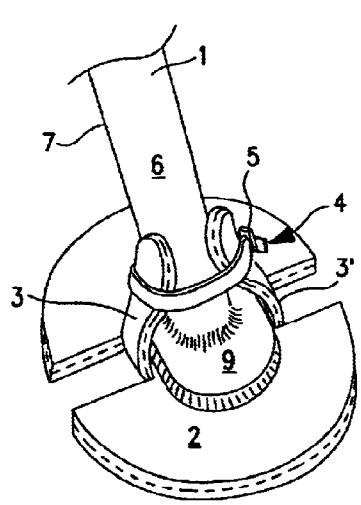
FIG. 5 a perspective view, from above, of the apparatus seen in FIG. 4 completely installed upon the kickstand, showing the attachment tabs folded into contact with the leg of the kickstand and the tightener band in tightened position.
Figure 6:
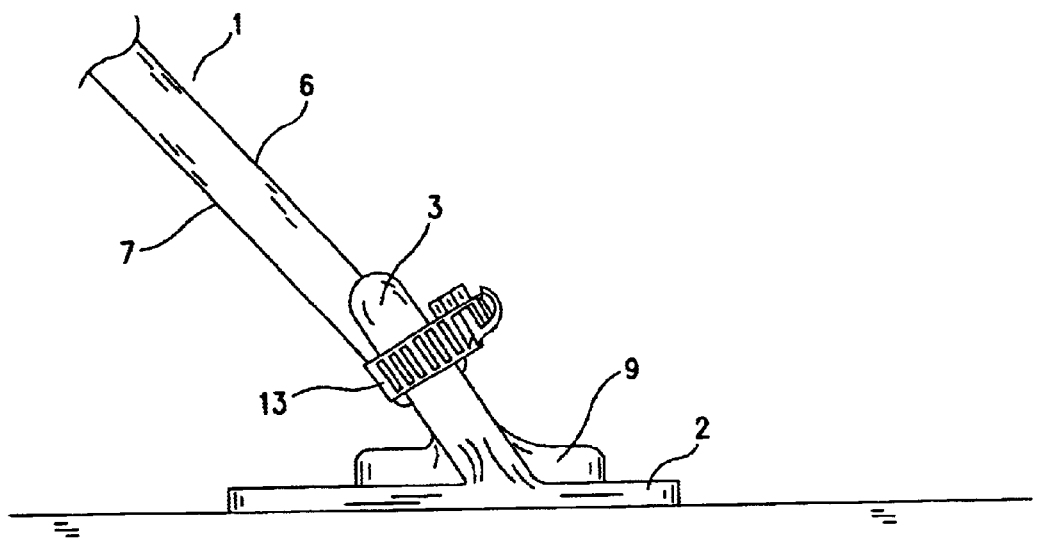
FIG. 6 is a left side elevation view of the apparatus shown in FIG. 5, but with the tightener band being a screw-actuated hose clamp.

The tabs 3, 3' are bendable to a position in flush contact with the leg 1 of the kickstand, as indicated by the directional arrows of FIG. 1, and as seen in FIGS. 5 and 6. With the tabs 3, 3' in contact with the leg 1, they can then be tightened against the leg and there held in place. A tightener band is disposable around the tabs 3, 3' and leg 1 as indicated by FIG. 4. The tightener band then is controllably tightenable to hold the tabs 3, 3' against the leg 1 of the kickstand, thereby to maintain the apparatus in place for use.

The tightener band 12 comprises any suitable looped device having a controllably adjustable functional circumference that may be tightened and locked. Preferably, the tightener band 12 is a toothed nylon strip 4 and ratchet clasp 5 of known construction, commonly referred to as a "zip tie," "tie wrap" or "cable tie" and available off-the-shelf. Alternatively, a conventional screw-actuated metal strip hose clamp 13 of known construction may be employed as a tightener band, as seen in FIG. 6. Other suitable tightener bands may be devised from durable straps secured with adhesives or mechanical fasteners.

Tabs 3, 3' are connected to the supporting pad 2 so as to be bendable toward the center of the pad. However, each of the tabs 3, 3' defines a longitudinal axis A, and the axes of the tab 3, 3' preferably are non-parallel and non-collinear, as best seen in FIG. 1. FIG. 1 shows that the axes A of the tabs 3, 3' are offset from the center C of the supporting pad 2. "Offset from the center C" means that the respective imaginary axes A of the tabs 3, 3' do not pass through the center of the pad 2 (i.e., the center of the pad is not at the point defined by the intersection of the imaginary lines of the axes A). Continued reference to FIG. 1 reveals some exemplary dimensional aspects and proportions of the apparatus, by way of illustration rather than limitation. Notably, the axes A of the tabs 3, 3' preferably are radially arranged so not to be collinear; rather the angle α subtended by the axes preferably is between about 140° to about 170°, and most preferably about 160°. Thus, the axes A are most preferably offset toward each other about 20° with respect to a diameter of the pad 2. Of course, suitable alternative embodiments have tab axes A that are collinear with a diameter of the pad 2.

Thus, as an advantageous result of the offset locations of the tabs 3, 3', when the tightener band 12 is tightened to press the tabs 3, 3' into secure frictional contact with the leg 1, the tabs preferably are situated on approximately diametrically opposite sides of the leg, as seen in FIGS. 5 and 6. This secure arrangement of the tabs 3, 3' on opposite sides of the leg 1 is realized despite the fact that the leg 1 is inclined in relation to the ground, and the base plate 9 and pad 2 are generally parallel to the ground, as best seen in FIG. 6. However, the apparatus may be installed upon kickstands having different angles with respect to the ground when in use, by the simple expedient of shifting the tabs 3, 3' slightly toward the inner face 7 or outer face 6 of the leg. Thus positioned, the tabs 3, 3' are disposed so as not to interfere with the engagement of the kickstand against the frame of the motorcycle when the kickstand is retracted when not in use.

In a simpler embodiment, the tabs 3, 3' may be situated to have collinear axes A, in which case when they are bent into flush contact with the leg of the kickstand, the tabs may be situated so as to cover proportionately more of the inner face 7 or of the outer face 6 of the of the leg.

Figure 7:
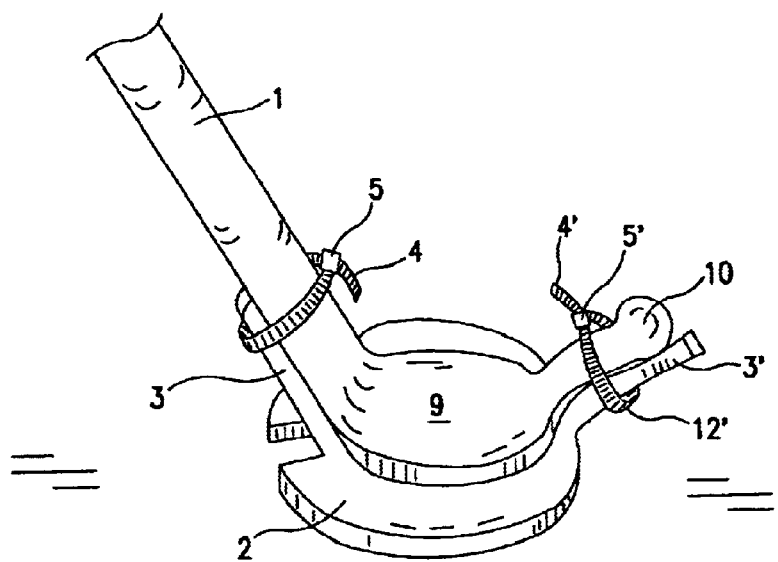
FIG. 7 is a perspective view, from above, of an alternative application of the invention.

Attention is invited to FIG. 7. Some types of motorcycle kickstands feature a leg 1 according to convention, and a base plate 9 that engages the ground, but also are equipped with a boot hook 10 extending from the base plate generally opposite from the leg 1. The boot hook 10 is a rigid protuberance provided for the convenience of the user in catching the kickstand with the user's shoe or boot to deploy or retract the kickstand. The apparatus of the invention is readily adaptable for secure attachment to these alternative types of kickstands. As seen in FIG. 7, the apparatus of the invention may be attached to such kickstands by rotating the apparatus through a horizontal arc of about 90° in relation to the position shown in FIG. 5. In such a position, the supporting pad 2 is centered beneath the base plate 9, but only one of the tabs 3 is secured to the leg 1 with a first tightener band 12. The second tab 3' is secured to the boot hook 10 with a second tightener band 12'. As seen in FIG. 7, both the tightener bands 12, 12 may be toothed strips 4, 4' with ratchet clasps 5, 5', as previously described, or may be hose clamps 13 as seen in FIG. 6.

The practice of the invention may now be briefly described. The apparatus is placed upon the ground, with the tabs 3, 3' extended outwardly generally co-planar with the supporting pad 2 as indicated in FIG. 1 or 2. The motorcycle kickstand is deployed to the extended, "in-use" position, and the distal end or base plate 9 is placed in the center of the pad 2, as indicated in FIG. 2. The top surface of the pad 2 is in contact with the bottom of the base plate 9; for example, the motorcycle may be rested upon the kickstand, with the pad 2 sandwiched between the bottom of the base plate 9 and the ground or floor. The tabs 3, 3' are bent from a position co-planar with the pad 2 to a position generally perpendicular thereto, and about parallel to the leg 1 of the kickstand, as suggested by FIGS. 2 and 3. The tightener band 12 is disposed circumferentially about the leg 1 and both tabs 3, 3', so as to wrap around them collectively. The tightener band 12, which preferably is a toothed strip 4 looped back on itself and its free end fed through a ratchet clasp 5, is controllably tightened so as to draw the tabs into constricted engagement against the leg 1 of the kickstand, as seen in FIG. 5. As suggested by a comparison of FIGS. 4 and 5, excess toothed strip 4 can be trimmed away with scissors once the tightener band 12 has been fully tightened. If desired, the tabs 3, 3' may also be trimmed with heavy duty scissors or snips. The apparatus thus is securely installed upon the kickstand, and remains thereon when the kickstand is not in use.

The simplicity of the invention allows it to be easily used and inexpensively manufactured. Its physical flexibility allows it to conform to a wide variety of differing kickstands, as well as to different supporting surfaces. The innovative radial offset positioning of the tabs 3, 3' permits the supporting pad 2 to be parallel to and securely sandwiched against the ground, yet also allows the tabs 3, 3' to be placed generally parallel alongside the leg of the kickstand at an angle (in relation to the ground) comparable to the incline defined by the leg itself. Such configuration maximizes the reliability of the attachment of the apparatus to the kickstand.

Of course, various embodiments of the apparatus may be customized for use on particular kickstands that are original equipment on various models of motorcycles. The size and shape of the supporting pad 2 may be customized to complement base plates of different sizes and shapes. Also, the angle α (FIG. 1) may be customized to accommodate the specific angle defined by a particular kickstand in relation to the ground when in use.

Bendable, flexible composition of the apparatus allows it to bend to conform for use with a wide variety of kickstand styles and shapes, including those which lack a discrete base plate. Also, the flexible character of the pad 2 suits it for use on uneven supporting surfaces, such as gravel, as the pad bends elastically to conform to the supporting surface.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications and patents cited above are hereby incorporated by reference.

What is claimed is:

1. An apparatus attachable to the distal end of a motorcycle kickstand to prevent the kickstand from sinking into the ground while in use, the kickstand having a base plate and a leg, said apparatus comprising:

a supporting pad having a center, and having a diameter substantially greater than said base plate;

at least two flexible attachment tabs extending from and bendably connected to said supporting pad, wherein said at least two tabs are bendable to a position approximately perpendicular to said supporting pad; and a tightener band for holding said attachment tab in said perpendicular position;

wherein each of said tabs defines a longitudinal axis, said axes of said tabs being mutually non-parallel and non-collinear, and offset from said pad center when said tabs are not bent.

2. An apparatus in combination with the distal end of a motorcycle kickstand, the kickstand having a leg and a base plate at said distal end, said apparatus comprising:

a supporting pad having a diameter substantially greater than said base plate of said kickstand;

at least one flexible attachment tab connected to said supporting pad, said tab bendable to a position in flush contact with said leg of said kickstand; and a tightener band disposable around said tab and leg and controllable tightenable to hold said tab against said leg of said kickstand.

3. An apparatus according to claim 2 comprising two said flexible tabs.

4. An apparatus according to claim 3 wherein said flexible tabs and said pad comprise a resiliently bendable reinforced rubber.

5. An apparatus according to claim 4 wherein said tabs and pad are integral.

6. An apparatus according to claim 3 wherein said supporting pad is generally circular and said tabs are disposed upon said pad to be bendable toward the center of said pad.

7. An apparatus in combination with a distal end of a motorcycle kickstand to prevent said kickstand from sinking into the ground while in use, said kickstand having a leg having an outer face and an inner face, and a base plate at said distal end, said apparatus comprising:

a supporting pad having a diameter substantially greater than said base plate and disposed flush against said base plate;

at least two flexible attachment tabs connected to said supporting pad, said tabs bendable to a position in flush contact with said leg of said kickstand; and a tightener band disposable around said tabs and leg and controllable tightenable to hold said tab against said leg.

8. An apparatus according to claim 7 wherein said flexible tabs and said pad comprise a resiliently bendable reinforced rubber.

9. An apparatus according to claim 8 wherein said supporting pad is generally circular and said tabs are connected to said pad to be bendable toward the center of said pad.

10. An apparatus in combination with a distal end of a motorcycle kickstand to prevent said kickstand from sinking into the ground while in use, said kickstand having a leg having an outer face and an inner face, and base plate at said distal end, said apparatus comprising:

a supporting pad having a diameter substantially greater than said base plate and disposed flush against said base plate;

at least two flexible attachment tabs connected to said supporting pad, said tabs bendable to a position in flush contact with said leg of said kickstand, and wherein each said tab defines a longitudinal axis, said axes of said tabs being non-parallel and non-collinear when said tabs are unbent; and a tightener band disposable around said tabs and leg and controllably tightenable to hold said tab against said leg;

wherein said flexible tabs and said pad comprise a resiliently bendable reinforced rubber, and further wherein said supporting pad is generally circular and said tabs are connected to said pad to be bendable toward the center of said pad.

11. An apparatus according to claim 10 wherein said axes are offset from the center of said supporting pad, whereby when said tabs are bent into flush contact with the leg of the kickstand, said tabs are substantially parallel to the leg.

* * * * *